United States Patent Office 2,841,287
Patented July 1, 1958

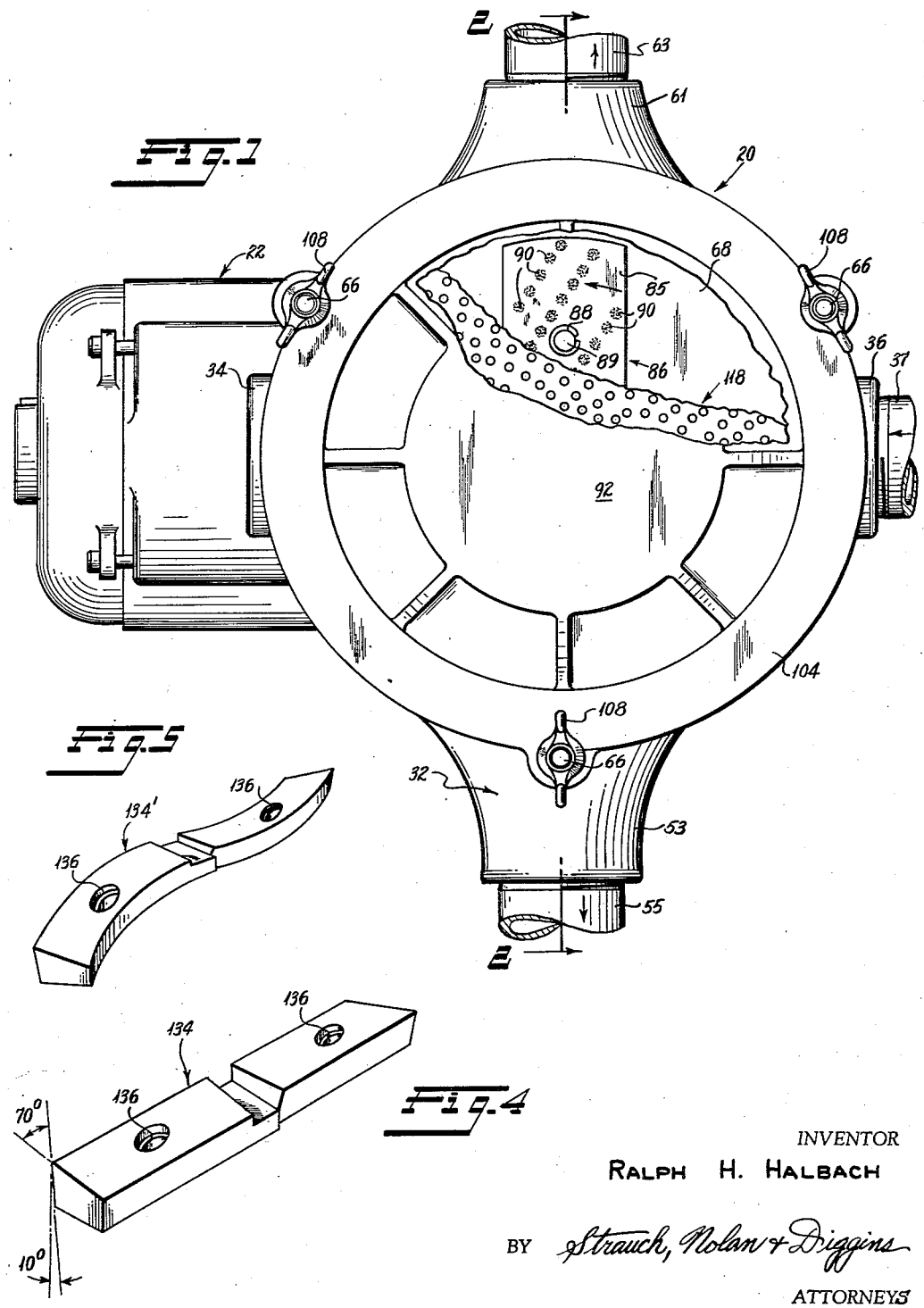

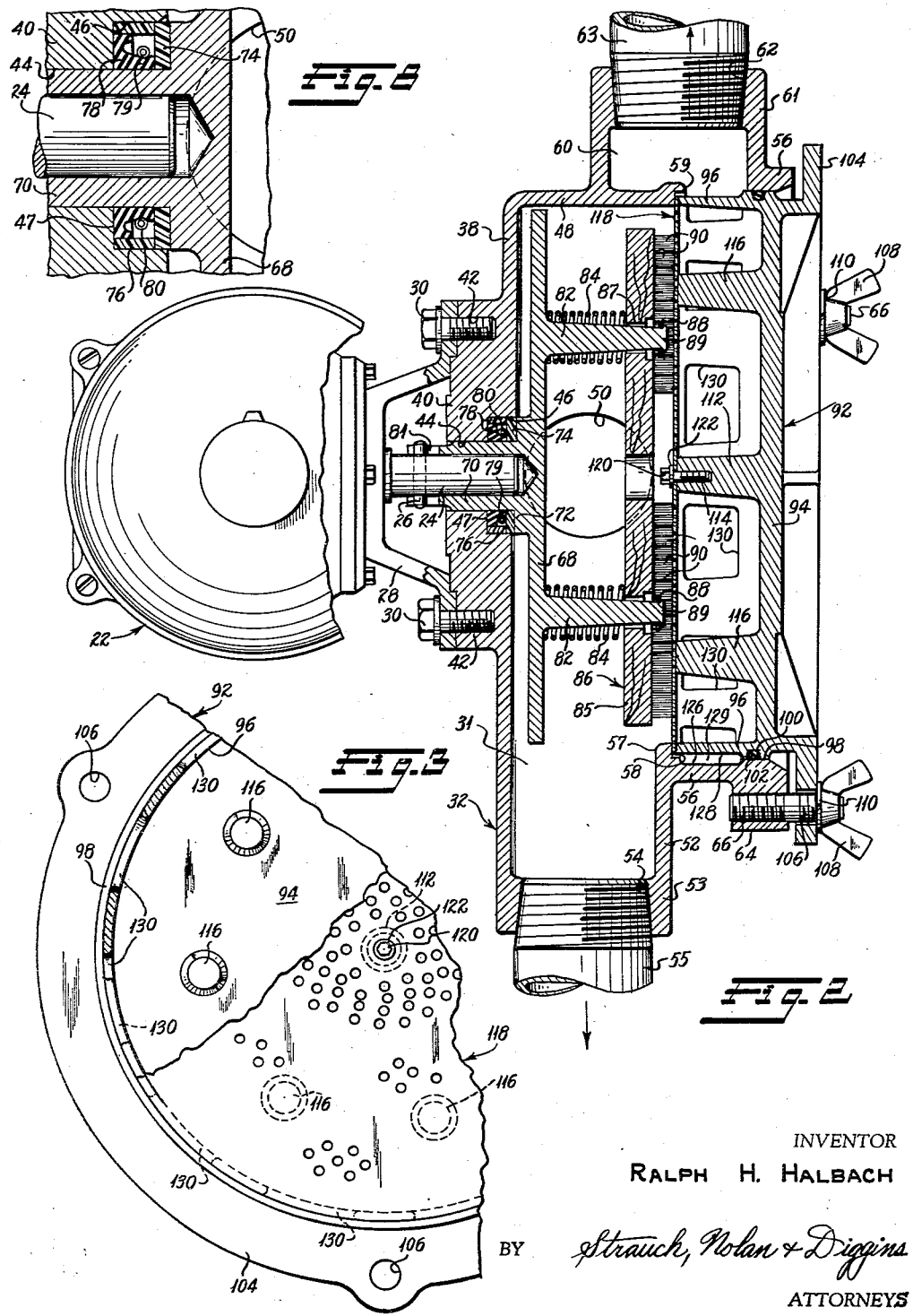

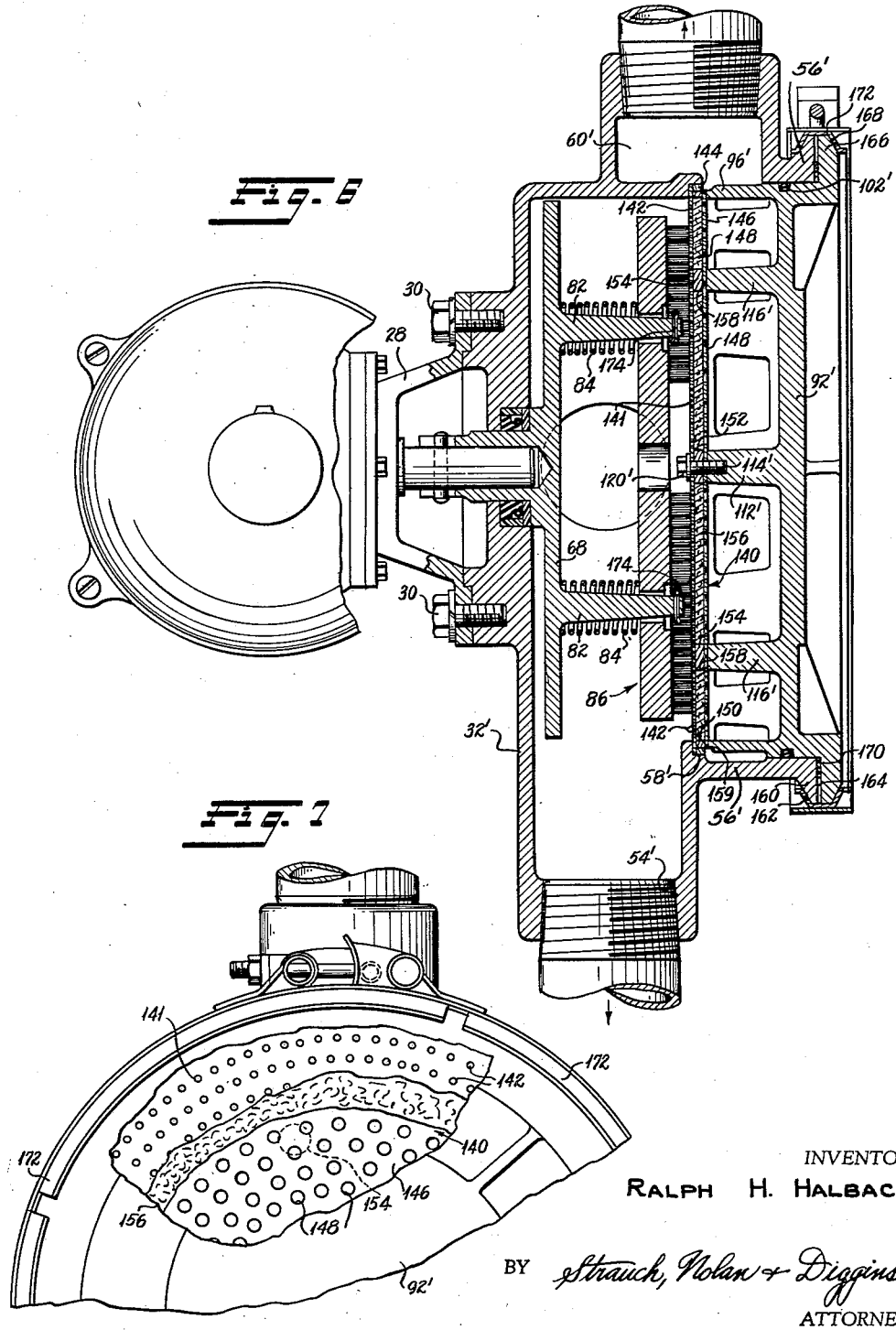

2,841,287

STRAINER CLEANING

Ralph H. Halbach, Eden Township, Alameda County, Calif., assignor, by mesne assignments, to Dorr-Oliver Incorporated, Stamford, Conn., a corporation of Delaware Application May 11, 1954, Serial No. 428,867

19 Claims. (Cl. 210—414)

This invention relates to improved strainer cleaning and more particularly to a small self-contained, self-cleaned, independent disc screen rotary strainer.

Previously known rotary strainers include some with cylindrical screens and others having disc screens. One illustrative type, now on the market, utilizes a cylindrical screen with the longitudinal axis of the screen arranged vertically. The inlet is at the upper end with the liquid outlet chamber surrounding the screen and provided with a laterally directed outlet opening. The lower part of the housing contains a guide bearing for a brush drive shaft and is also provided with an outlet opening for solids brushed from the screen. The top cover plate includes a guide bearing and seal for the shaft. Spring-loaded contoured brushes are attached to the shaft by a complex linkage arrangement and engage in mating relation with the interior cylindrical surface of the screen. This rotary strainer performs its function well, but has several inherent drawbacks. One of these, centrifugal action imparted to the material being strained by the rotating brushes, is impossible to eliminate in a cylindrical strainer and results in various amounts of solids being forced through the screen. Disregarding centrifugal action, the brush and screen arrangement also results in oversize particles being forced into and sometimes through the screen. The multitude of parts necessary in the construction of this strainer increases production costs and results in many small parts, including bearings, continuously immersed in the material being strained and therefore subject to any corrosive effects between the materials. The numerous parts in a machine of this type contribute to time consumed in periodic cleanings, and in other ways, well known to industry, contribute to the operating cost. The machine is large, cumbersome and costly to produce and operate.

Another prior form of rotary strainer is one having an annular wall with disc screens at either side and a stationary bearing spider located in the chamber formed within the annular wall and the screens. A shaft passes through the screens and internal bearing and carries a brush at both sides of the assembly. A liquid outlet is provided in the annular wall for removing the liquids that pass through the screens to the interior of the chamber when the assembly is submerged in a tank of material such as fruit pulp and juices. The brush assembly is rotated by a pulley and is designed to force a specific percentage of solids through the screens. This unit is intended to operate while totally submerged in the material being strained, therefore the entire apparatus, including bearings, are subject to corrosive effects of the material. The arrangement of this unit necessitated a bulky permanent assembly and required a large expenditure of labor and non-productive cost consuming time each time it had to be disassembled for cleaning or repair. There is normally no convenient self contained means for removal of the material wiped from the screen and conceivably the tank would become full of the oversize coarse materials and necessitate a shutdown of operations while the tank was cleaned.

The present invention eliminates the aforementioned drawbacks of the known prior art, by reducing the number of parts to a minimum; by eliminating bearings, except for a simple composition thrust washer, from the interior of the strainer; by utilizing a single disc shaped straining unit; by accomplishing all straining within a compact housing; and by constructing and relating the elements in such a manner as to require a minimum of time to disassemble the relatively few parts, which are then conveniently accessible for cleaning. By constructing the straining element as a unitary disc, easily replaced, this invention is capable of utilizing a structurally rugged filter screen for combined screening and filtering operations when such operation is desired.

The novel features of this invention pertain more specifically to the compact assembly of novel elements in a strainer and the structurally associated cooperating drive. By providing an integral main strainer housing, including the material inlet and the solids and liquid outlets, the number of structural joints are reduced and the requirements for seal means for preventing leakage are accordingly reduced. The invention comprises a rotating internal strainer cleaner that includes a spider with a stub shaft piloted on a driving shaft extending from the motor gear box, thus eliminating need for radial bearings in the strainer housing. The strainer unit cover is constructed to carry the straining screen and provide passage for strained liquid to pass from the main housing inlet through the screen to the liquid outlet. Unitary construction of the screen and cover provide a convenient means for removing and cleaning the screen and, when removed, provides unobstructed access to all parts of the housing interior. The cover unit cooperates with and retains the internal cleaning mechanism in proper relation to the driving mechanism and the screen and through the cleaning mechanism maintains the shaft seal in sealing engagement against the rear wall of the housing. The cleaning mechanism is structurally interrelated with the drive shaft in such a manner as to enable quick disassembly when the cover is removed without the necessity of any further disconnecting operations.

Briefly it is desired to provide a small self-cleaning strainer capable of removing tramp material (such as pipe scale, coarse pulp, fibers, etc.) from slurries and other feed materials passed through conduits to a processing point or station. The strainer should be simple in construction and the construction should provide ready access to all parts for removal and/or cleaning.

With these and other considerations in view, it is an important object of this invention to provide a simple compact self-cleaning rotary strainer unit.

A further object resides in the provision of an improved unitary strainer housing providing a material inlet, a solids outlet, a liquid outlet and provided with means for receiving a novel combined cover and strainer.

A still further object resides in the provision of coacting rotary strainer and drive structure whereby internal support bearings are eliminated from the strainer housing.

A still further object resides in the novel arrangement between the drive shaft, the housing, the brush spider and the cover unit of a self-cleaning rotary strainer resulting in a minimum number of parts all held in assembly by convenient clamping means between the cover and the strainer housing.

A still furthre object resides in the provision of a novel resiliently biased arrangement between the brush and the brush spider, which in cooperation with the housing cover unit, provides a force maintaining the shaft seal in position, and the spider in driving engagement with the drive shaft and maintains proper brush pressure against the strainer screen.

Still another object resides in the novel structure of the cover unit to carry and clamp the strainer screen in operative position, to cooperate with the strainer housing to provide passages from the screen to the liquid outlet chamber, and to further cooperate with the housing by a special seal arrangement to assure a leakproof fit.

Another object resides in the arrangement of the tufts of bristles in the body of the strainer brush, which in cooperation with the remaining structure provides a novel means for effectively scrubbing the face of the screen yet at the same time creating a spiral action on the solids being cleaned from the screen, to carry the screened material to the periphery of the brush chamber.

A still further object rests in the novel arrangement of the brush spider to carry either brushes or scrapers.

A still further object resides in the provision of a conveniently removably flat material straining element in a rotary strainer.

Further objects and advantages of the invention will be apparent from the following description and the appended claims in conjunction with the accompanying drawings.

The preferred embodiments of the invention herein disclosed are illustrated in the following drawings in which:

Figure 1 is a front elevation view of the strainer unit with the cover broken away to show the screen and the screen partially broken away to show the brush;

Figure 2 is a slightly enlarged plan view of the unit showing the strainer mainly in section as taken on lines 2—2 of Figure 1;

Figure 3 is a fragmentary rear detail view of the cover assembly with the screen partially broken away;

Figures 4 and 5 are perspective views of scraper modifications, as alternative substitutes for the brush;

Figure 6 is a plan view similar to Figure 2 showing an alternative embodiment wherein a filter screen is substituted for the single disc screen;

Figure 7 is a fragmentary elevation of the alternative embodiment showing the quick disconnect of the clamping ring; and Figure 8 is an enlarged detail view of the shaft seal.

In the embodiment of Figures 1–3, an independent unit is disclosed having an inlet 50 for receiving fluent material including fluids to be strained, means for straining the fluid, and other mechanisms for keeping the straining means from clogging, together with outlets 62 and 54 for the liquid and the separated solids respectively as will appear. The operating mechanism comprises two sub-assemblies, the enclosed strainer assembly 20 and a detachable drive unit 22.

The motor to be used in the preferred embodiment may be any commercial motor having an output shaft 24 provided with a bayonet fitting 26. Included as part of the drive unit and rigid with the motor housing is a mounting flange 28 fastened to the strainer housing as by bolts 30. Shaft 24 is retained in the drive unit by conventional thrust and radial journals (not shown). A self contained separate reduction gear drive (not shown) having either belt or flexible coupling connection between driven shaft of gear drive and motor may be substituted for the motor disclosed.

Strainer assembly 20 comprises an integral housing 32 made of bronze, stainless steel or other suitable material that is resistant to corrosion by water and enclosing chamber 31. Integrally formed on the sides of housing 32 are two bosses 34 and 36, one, 34, being solid and used for attaching a mounting flange for attaching the unit to a support or base (not shown), and the other, 36, being provided with a through opening from the housing interior to exterior and tapped or otherwise provided with means for connecting inlet pipe 37 to the housing. The rear wall 38 of the housing is substantially circular in configuration with a central outstanding external boss 40 having tapped holes 42 extending therein to receive the motor mounting bolts 30. A bore 44 extends through the center of boss 40 and joins a counterbore 46 in the inner face of wall 38 thus providing an annular shoulder 47 surrounding the central bore. A peripheral wall 48 continuously extends around the sides and top of the rear wall 38, interrupted at one side by inlet opening 50 through boss 36. At the bottom of the housing, rear wall 38, peripheral wall 48 and a front wall 52 are integrally joined and formed with a depending outlet boss 53 having an opening 54 suitably threaded to connect with a solids outlet conduit 55.

The peripheral wall 48 of strainer housing 32 is extended toward the front of the housing and is circumferentially joined to form an integral annular axially directed flange 56. The inner periphery of flange 56 is provided with a radially inwardly projected shoulder 57 having an annular flat seating surface 58. An opening 59 is formed at the top of the annular axial flange 56 which enables passage of strained fluid into an outlet chamber 60 formed in integral boss 61 at the top of housing 32. Boss 61 has a threaded bore 62 passing radially outward from chamber 60 for connecting a liquid outlet conduit 63. Spaced at suitable intervals around the edge of the outer periphery of flange 56 are enlarged integral bosses 64 threaded to receive cover retaining studs 66.

Positioned within housing 32 is a rotatable spider 68 having an integral hollow stub shaft 70 projecting rotatably through the central bore 44. At the base of stub shaft 70 a radially planar seating surface 72 is provided and bears against a set of sealing thrust washers 74 and 76 disposed within the counterbore 46. Also positioned within counterbore 46 and in surrounding relation to the stub shaft 70 is a spring loaded shaft seal 78 to prevent leakage from the interior of the housing along the surface of shaft 70 through bore 44. The seal body is fabricated of resilient material suitably chosen to resist deterioration by the materials being strained. The inner axially extending flange 79 of this seal is slightly longer in its free state than the axial length of the thrust washer 76, so the washer 74, when held against the seal body by coaction between the assembled elements, will slightly compress the seal against counterbore shoulder 47. The seal spring 80 maintains the seal flange 79 in tight engagement against the circumference of the spider stub shaft 70. The strainer thrust washers 74 and 76, while preferably made of Micarta, may be fabricated of any material suitably resistant to the fluids and materials being strained. The substance identified by the name "Micarta" is a heavy duty, thermo setting, plastic material made from fabric or paper impregnated with phenol formaldehyde resins and compressed under heat into a permanently solid substance with high structural and dielectric properties. "Micarta" can be laminated or molded and the molded class of Micarta is made from chopped pieces of impregnated fabric or paper bonded under heat and pressure. The internal diameter of stub shaft 70 permits a sliding fit over the end of power shaft 24 and has slots 81 cut in the end to provide an axially extensible driving connection with the quick disconnect, bayonet coupling 26. The spider 68 is thus supported by the drive shaft in an overhung relation, and there are no shaft bearings within the interior of housing 32 exposed to corrosive materials.

The main body of spider 68 is oblong in shape and includes two integral diametrically opposed outstanding tapered posts 82. Surrounding each post 82 is a compression spring 84 which reacts against the main body of the spider. A brush 86 is mounted in a floating arrangement on posts 82, and abuts and compresses springs 84 in the assembly. The main body of brush 86 is preferably a hard wood block 85 but may be made of other suitable materials and has projecting therefrom a plurality of tufts of bristles 90 formed in overlapping inclined rows disposed approximately 33° to the lengthwise centerline of the brush body as shown in Figure 1. This inclination of the lines of bristles is so arranged to spirally guide and pass the solid materials toward the periphery of the brush chamber 31, where the heavy particles and solids will follow the walls down to the solids outlet 54 when the brush is rotated counterclockwise in Figure 1.

As shown in Figure 2, block 85 is formed with apertures 87 through which posts 82 project freely slidably when the parts are positioned as therein illustrated in operative assembly. Posts 82 each carry a snap ring 88 retained thereon by the enlarged post ends 89 and larger than apertures 87 so as to limit the outer brush position. Preferably post ends 89 are smaller than bores 87 so that upon removal of snap rings 88 the brush 86 can be removed from posts 82. Apertures 87 may be counterbored at their bristle ends to receive the snap rings in the limit position.

The strainer cover 92 comprises a transverse circular wall 94 having an integral axially directed peripheral flange 96 adapted to fit within the recess formed by the housing flange 56. Approximately coextensive with the circular wall 94, an annular piloting ridge 98 is provided on the outer circumference of flange 96 and radially positions the cover within annular flange 56. As shown in Figure 2, a circumferential groove 100 is formed in ridge 98 and contains a compressed rubber O-ring gasket 102. The groove and O-ring sealing gasket may alternatively be located in a groove cut on the interior circumference of flange 56. In either case the O-ring is slightly deformed on assembly and provides excellent sealing characteristics for preventing leakage of the strained liquid. On the side of transverse wall 94, opposite the axial flange 96, an integral peripheral radial flange 104 is provided and has apertures 106 formed therein corresponding in number and location to the cover retaining studs 66. When the cover 92 is placed in position with the annular recess of housing 32, the apertures 106 fit over studs 66 and the cover is clamped to the housing by wing nuts 108 and lock washers 110.

The inner side of the cover wall 94 has an integrally formed central support finger 112 projecting to the plane of the rear edge of axial flange 96. The end of finger 112 has a blind hole 114 tapped to receive a bolt, as will be described. Annularly arranged, approximately two-thirds of the radial distance from the center of the cover to axial flange 96, are a plurality of axially projecting fingers 116, similar in all respects, except for the tapped opening, to central finger 112. The end surfaces of all of these fingers and the annular edge of axial flange 96 lie in the same plane and provide a support for a disk-shaped flat strainer screen 118 that may be perforated sheet metal or woven wire. The screen may be fabricated in any mesh size and of stainless steel, bronze or any material suitable for straining operation and depending on the corrosion or erosion characteristics of the fluent material. The diameter of screen 118 is equal to the outer diameter of the edge of axial flange 96 and lies on the aforementioned plane supported by the edge of the axial flange and the ends of the support fingers. An aperture is located at the center of disk 118 to provide passage for a bolt 120 screw threaded in tapped opening 114 of central finger 112, which, in cooperation with lock washer 122, holds the screen on the strainer cover 92. Preferably screen 118, which is vertical in the assembly, is sufficiently stiff and self-supporting to normally lie against the flat finger end faces when bolt 120 is tightened.

When the cover, including screen 118, is assembled in the housing recess formed by flange 56, the edges of axial flange 96 rest against the peripheral margin of the screen 118 and clamp the screen tightly against the seating surface 58 in the housing. In assembled form, the screen 118 bears against brush bristles 90 and forces the brush 86 back against springs 84 which are thus compressed as shown in Figure 2. It is thus seen that a force is constantly resiliently urging the brush bristles against the strainer screen. The complementary reactive spring force resiliently urges the spider stub shaft 70 slidably along bore 44 and forces the seating surface 72 constantly against thrust washers 74 and 76 which coact with the seal 78 in the aforementioned manner. It is noted that no radial or guide bearings are located in or directly on the strainer 20 and the spider 68 is guided and maintained radially by the aforementioned overhung relationship between the spider 68 and the drive shaft 24. The bearings supporting shaft 24 are the sole radial support used for the strainer spider since bore 44 is not a radial bearing for shaft 70.

The inner circumference of the axial flange 56 on the main housing is undercut to form a recess 126 extending around the flange and ending at the strained liquid outlet chamber 60 and the outer circumference of the axial flange 96 on the cover 92 is undercut to form an annular recess 128 substantially complementary in the assembly to the recess 126 in flange 56. The two recesses 126 and 128, in assembled relation, provide a substantially annular chamber 129 surrounding the axial flange 96 and opening into outlet chamber 60. A plurality of openings 130 are formed in the axial flange 96 to enable passage of fluid from the interior of housing 32 through the screen 118 and to the annular chamber 129.

During operation of the device, the fluent material to be strained, which may contain pipe scale, pulp, fibers or other solid particles, is introduced through conduit 37 and the inlet opening 50. The outlet conduit 55 is connected to means (not shown) for collecting the separated solids. Conduit 63 connects to the outlet opening 62 at the top of the strainer unit and provides mean for conducting the strained liquids to further use or processing. When the raw fluent material enters inlet 50, the flow path toward the liquid outlet will carry the fluent material to the screen 118 where the liquids pass through the screen and the separated solids are collected on the screen, the larger, heavier particles tending to settle toward the bottom of the housing. The rotating brush 86 with the diagonal rows of bristles, which rotates on a horizontal axis, will continually maintain the screen free from collected pulp, fibers or solids and, because of the inclination of the brush bristle rows, will tend to spirally and centrifugally pass the screened solids outwardly toward the outer periphery of the brush chamber 31. The diagonal arrangement of the rows of bristles and the radial off-set of individual tufts in adjacent rows enables the bristles to effectively scrub the entire area of the screen.

In some specific instances the solids being strained from the liquid may tend to collect on and around and clog the brush bristles, rendering the brush ineffective for proper cleaning of the screen. In such operations a scraper 134 (Figure 4) and 134' (Figure 5) may be used in lieu of the brush. The scrapers are preferably fabricated from synthetic material such as lignum vitae, Micarta or some other suitable material to withstand the corrosive and abrasive effects of the material being strained. The scrapers may be substantially rectangular as in Figure 4 or spiralled as in Figure 5, and are provided with recessed apertures 136 to pass freely over the spider posts 82 to compress springs 84 in a manner similar to that shown and described for brush 86. The top face and leading face of each half of the scraper are inclined 10° from the horizontal and vertical planes respectively, resulting in a 70° scraping edge. As the values set forth are merely illustrative of one particular installation it will be appreciated that the angles may be varied according to the materials being separated and scraped from the strainer screen. The spiral bladed scraper 134' is preferred as such spiral shape will conveniently pass the removed material to the peripheral of the cleaning chamber.

The foregoing assembly is compact and easy to assemble and in the assembly the dual acting compression springs function both to urge the brush bristles against the screen 118 and to spring load the annular seal about shaft 70. Should the screen surface not be strictly flat or vertical or should the bristles be uneven this spring action will compensatively shift the floating brush toward and away from the screen to insure full surface brushing of the screen. Furthermore in addition to the float axially of the rotating spider, the brush may float substantially in the plane of the screen which insures that the bristles do not always have the same contact with the screen thereby providing for uniform wear of the screen and contributing to its life. All the while the brush is compensatively floating, springs 84 exert a continuous almost constant load on the seal at 79.

In some particular applications of straining operations it may be desirable to also filter the liquids being strained at the time the straining operation is taking place to remove fine particles that can pass through the screen. As disclosed in Figure 6, the simple strainer screen shown in Figure 2 may be replaced by a combined strainer screen and filter assembly 140. This assembly 140, as illustrated, comprises a disk shaped inner screen 141 perforated with one-sixteenth inch diameter holes 142. The inner screen 141 has a diameter equal to the diameter of recessed seat 58' provided in the main housing 32' and has a ring 144 spot welded around the peripheral margin of its face. An outer screen 146, perforated with one-quarter inch diameter holes 148, is provided with a similar spot welded ring 150, having an outside diameter equal to the inside diameter of the inner screen ring 144, adapted to nest within the ring 144. A pierced circular spacer 152 is spot welded to the center of screen 146 and the pierced opening corresponds with bolt openings in each screen and the tapped hole 114' in the central finger 112' of cover 92'. Individual circular spacers 154 are spot welded in an annular arrangement on the same face of the outer screen 146 as ring 150 at locations corresponding to the end surfaces of the annular ring of projecting fingers 116' on the cover, and their diameters correspond substantially to the diameters of the end surfaces of fingers 116'. The spacers 152 and 154 may alternatively be fixed to the inner screen. A filter material can be preformed into a disk 156 whose diameter is substantially equivalent to the inner diameter of the outer screen ring 150. The filter disk 156 has openings 158 formed therein corresponding in size and position to the spacers 152 and 154. Alternatively, the filter material may be merely a filter wool such as glass wool packed between the screens. The filter screen may be assembled by placing the filter disk 156 or packing filter wool within the outer screen, the openings 158 of the disk being guided on the spacers 152 and 154, placing the inner screen 141 over the outer screen so ring 144 encircles ring 150 and the spacers abut the inner screen, and fastening the assembled screens and filter 140 to the inner face of cover 92' by bolt 120'. The annular end surface of axial flange 96' is undercut as indicated at 159 so the end surface bears only against the outer screen peripheral margin and not against ring 144, assuring a tight fit between screen 141, ring 150, screen 146 and seat 58'. The integral cover fingers 112' and 116' cooperate with the outer screen 146 to provide a rigid support against the flow of fluid and to also support the inner screen 141 through cooperation with spacers 152 and 154.

The modified strainer of Figures 6 and 7, is provided with an alternative cover clamping arrangement comprising a radially directed flange 160 on the marginal edge of the housing structure 56' beveled on the rear side 162, with the front surface 164 lying in a radial plane. The cover 92' is provided with a corresponding radial flange 166 having a radial plane surface opposing the plane surface 164 of flange 160. The front surface 168 of flange 166 is beveled opposite to that of beveled surface 162. Surrounding and cooperating with annular beveled surfaces 162 and 168 of flanges 160 and 166 is a quick acting V-clamp 172. A quick acting clamp is desirable if the strainer is to be used in filtering operations because the cover is removed to replace filters at more frequent intervals than is necessary in a straight straining operation. In such cases a flat gasket 170 may be used with or as an alternative for the O ring seal 102'.

An alternative means of retaining the brush on the spider posts 82' is shown in Figure 6, where cotter pins 174 are used rather than retaining clips 88 as shown in Figure 2. Note the means for retaining the brush on the spider functions as a retaining means only when the cover is removed, inasmuch as the assembled cover forces the brush onto posts 82 against the bias of the springs 84.

The strainer body, and all parts associated therewith that come in contact with the material being strained, may be made of bronze, stainless steel or any other suitable material that will resist corrosive effects of the material being strained. Furthermore the types of screens, the size mesh, the types of filter and the width of the filter screen assembly may be varied according to the specifications necessary for the material being strained or filtered.

It will be understood from the foregoing description that this invention provides an efficient, compact, independent, self-cleaning strainer unit that imparts a radially outward movement to the material solids to increase separation and disposal of the strained solids. The unit has no critical bearings subjected to possible corrosive deterioration by the material being strained. The parts are easily disassembled for cleaning, the brush may be easily replaced with other different style brushes or with the scraper previously mentioned, the filter disk may be replaced within the screen assembly and the spider may be readily removed for checking and replacing worn thrust washers. Higher quality, more efficient straining operations may be performed at considerably higher speeds than were attained by machines of the prior art. All of these factors contribute toward savings in the operational cost of straining or filtering materials, and, combined with a lower production cost because of simplification of elements, this unit will result in substantial savings to anyone using strainers in their operations.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed and desired to be secured by United States Letters Patent is:

1. In a self-cleaning strainer assembly, housing structure the interior of which has a strainer that separates it into one chamber that is connected to an inlet for fluent material to be strained and an outlet for solids separated by the straining operation and another chamber that is connected to a strained fluid outlet, means for continuously cleaning said strainer comprising a spider mounted in said one chamber for rotation about an axis substantially normal to the surface of the strainer and having a drive shaft connection projecting rotatably through an aperture in the side of said housing structure, a strainer surface cleaning member mounted on said spider for limited displacement toward and away from said screen, resilient means compressed between the cleaning member and the spider in the assembly, and an annular seal assembly at said aperture surrounding said shaft and axially contacted by said spider, said resilient means serving both to maintain said cleaning member against the screen surface and to constantly load said seal assembly to prevent leakage from said one chamber through said aperture.

2. A strainer unit comprising; a housing having a rear wall with an aperture therein, a perpendicular side wall at the periphery of and extending from one side of said rear wall and terminating in an annular flange, an annular seat on the inner surface of said flange and spaced from said rear wall, cover guide means on said flange, an inlet and first outlet located between said seat and rear wall, a second outlet located between said seat and the edge of said flange; a drive unit mounted on the outside of said housing having a drive shaft extending perpendicular relative to said rear wall and coaxial with said aperture; rotating means within said housing having a stub shaft projecting through said aperture; means connecting said stub shaft and said drive shaft and providing the sole radial support for said rotating means; a cover member nested within said flange guide means; a material straining element carried by said cover and seated against said seat so any material flowing from said inlet to said second outlet must pass through said straining element; and a straining element cleaner carried by said rotating means and contacting the inlet side face of said straining element.

3. A self-cleaning strainer unit comprising a housing having at least one inlet, outlets, an aperture in a housing wall and means for straining fluent materials passing between said inlet and one of said outlets; a drive unit mounted on the exterior of said housing and having an axially and radially fixed drive shaft disposed with its axis coextensive with the axis of said aperture; rotatable means within said housing having an integral stub shaft projecting through said aperture, fitting with, free for axial shifting relative to, and drivingly coupled to said drive shaft; and a cleaning member carrier by said rotatable means and cooperating with said straining means.

4. A strainer unit as set forth in claim 3, wherein the rotatable means has a plurality of axially projecting posts; and the cleaning member comprises a brush displaceably mounted on said posts and having a plurality of rows of bristles, the bristles extending substantially parallel to the axis of said rotatable means and the rows being inclined relative to the direction of rotation of said said rotatable means for effecting outward displacement of the solids on said straining means.

5. A strainer unit as set forth in claim 3, wherein said cleaning member comprises a composition scraper biased into engagement with said straining means.

6. A unit as set forth in claim 5, wherein said scraper has blades inclined outwardly in a direction opposite to the direction of rotation of the rotatable means.

7. In combination in a rotary self-cleaning strainer, a housing, a combined cover and strainer assembly, internal resilient biased rotating strainer cleaning means, a driving shaft for said rotating means passing through the wall of said housing, and seal means cooperating between said shaft and said housing and maintained in compressive sealing engagement with said housing and shaft by combined assembled cooperation between said resiliently biased rotating cleaning means and said cover assembly.

8. A rotary strainer unit comprising a housing with openings formed therein for fluent material inlet, liquid outlet and solids outlet, an aperture formed in a wall of said housing; straining means disposed between said inlet and solids outlet openings and the liquid outlet opening; rotatable means within said housing including a body, a stub shaft projecting from one side of said body and through said aperture and a plurality of posts substantially parallel to the axis of said stub shaft and projecting from said body on the side opposite said stub shaft; shaft seal and thrust means disposed about said aperture and coacting with said rotatable means; a member carried by said posts for cleaning said straining means; resilient means mounted between and biasing said rotatable means and said cleaning member apart and thereby assuring constant engagement between the rotatable means and the said thrust and seal means and between the cleaning member and said straining means.

9. A cover assembly for a strainer unit comprising a wall with an annular flange projecting substantially perpendicular from one side of said wall adapted to cooperate with an opening in a strainer housing and a plurality of radially directed openings through said flange, a straining member with a peripheral margin substantially coextensive with and resting on the edge of said flange and means fastening said straining member to said wall.

10. A cover assembly for a rotary strainer unit comprising a wall with an axially directed peripheral flange having an outer circumscribing piloting surface adapted to cooperate with an opening in a strainer housing, a plurality of supports projecting perpendicular from said wall within the chamber formed by the flange and said wall and having end surfaces lying in the plane defined by the edge of said cover flange and a plurality of radially directed openings through said flange; a straining member with a peripheral margin substantially coextensive with and resting on the edge of said flange and against the end surfaces of said supports; and means fastening said straining member to at least one of said supports.

11. A self-cleaning independent strainer unit comprising: an integral housing having a rear wall with an aperture formed therein, a peripheral side wall terminating in a peripheral flange extending perpendicularly from said wall, a peripheral seat extending inwardly from the inner surface of said flange, a circumscribing piloting surface on the inner surface of said flange, an inlet and a first outlet in said side wall located between the seat and the rear wall, a circumscribing recess in the inner surface of said flange between its edge and the said seat, a second outlet through said flange opening from said recess, and an annular counter-bore in the inner surface of said rear wall surrounding said aperture; a drive unit mounted on the exterior of said wall having an axially and radially fixed drive shaft disposed with its axis coextensive with the axis of said aperture; rotatable means within said housing comprising a body substantially perpendicular to the axis of said drive shaft, a hollow stub shaft projecting from said body through said aperture, fitting over, free for axial shifting relative to, and drivingly coupled to said drive shaft to thereby support said rotatable means, and a plurality of posts parallel to said axis and projecting from said body on the side opposite said stub shaft; shaft seal and thrust means disposed in said counterbore and coacting with said rotatable means; a cleaning member having holes therein enabling said member to be displaceably mounted on said posts; resilient means engaging between and biasing said body and said cleaning member apart; a cover including a wall with an axially directed peripheral flange having an outer peripheral piloting surface and fitted within the housing flange so the two piloting surfaces are coextensive with each other, a plurality of fingers projecting perpendicularly from said cover wall within the chamber formed by the cover flange and having end surfaces lying in the plane defined by the edge of said cover flange, and a plurality of openings provided through said cover flange; a flat straining element having one face in contacting relation with said cleaning member and the other face resting against said fingers, with its peripheral margin substantially coextensive with and disposed between the edge of the cover flange and said peripheral seat; means connecting said straining element to at least one of said fingers; and means clamping said cover in liquid tight relation within said housing flange to thereby clamp said straining element against said seat.

12. In a strainer unit: an integral housing comprising a rear wall with an aperture formed therein, a side wall at the periphery of and extending from one face of said rear wall and terminating in a peripheral flange, a peripheral seat directed radially inward from the inner surface of said flange and spaced from said rear wall, an inlet and an outlet in said side wall located between the seat and the rear wall, a substantially circumscribing recess in the inner surface of said flange between its edge and the said seat, a second outlet through said flange and opening from said recess; a cover with an apertured annular axial flange having its external surface recessed in a manner complementary to said circumscribing recess, a straining element fixed to said flange, said combined cover and straining element positioned within said housing flange with said screen seated on said seat; and a rotating cleaning means within said housing coacting with said straining element and having a shaft passing through said aperture.

13. A cover assembly for a strainer unit comprising: a wall with an annular flange projecting substantially perpendicular from one side of said wall adapted to cooperate within an opening in a strainer housing, at least one radially directed opening through said flange, a circumscribing recess provided in the exterior surface of said flange, a piloting surface provided on said flange at one side of said recess, said piloting surface being circumscribed with a groove, and seal means disposed in said groove.

14. A cover assembly for a strainer unit as claimed in claim 13 including a straining member with a peripheral margin substantially coextensive with and resting on the edge of said flange and means fastening said straining member to said wall.

15. In combination in a rotary self-cleaning strainer: a housing; a cover and strainer assembly; internal resiliently biased rotating strainer cleaning means; a driving shaft for said rotating means passing through the wall of said housing; and a seal assembly cooperating between said rotating cleaning means, said housing and said shaft including means for resisting thrust from the combined assembled cooperation between said resiliently biased rotating cleaning means and said cover member, and seal means structurally maintained in sealing engagement with said shaft and said housing by said means for resisting thrust.

16. The rotary self-cleaning strainer as defined in claim 15 wherein a recess is provided in said housing wall surrounding an aperture for said shaft, and said seal assembly comprises a resilient spring loaded seal ring disposed on said shaft within said recess, and two ring shaped thrust members, one surrounding said seal ring within said recess and the other juxtaposed the sides of said seal ring and said one ring shaped thrust member between the rotatable cleaning member and said housing wall.

17. A strainer unit as set forth in claim 7, wherein the rotatable strainer cleaning means comprises a brush having a plurality of rows of bristles, the bristles extending substantially parallel to the axis of said rotatable strainer cleaning means and the rows being inclined relative to the direction of rotation of said rotatable strainer cleaner means for effecting outward displacement of the solids on said strainer assembly.

18. A strainer combination as set forth in claim 7, wherein said rotatable strainer cleaning means comprises a composition scraper biased into engagement with said strainer assembly.

19. A strainer combination as set forth in claim 18, wherein said scraper has blades inclined outwardly in a direction opposite to the direction of rotation of the rotatable strainer cleaning means.

References Cited in the file of this patent

UNITED STATES PATENTS

| | | |
|---|---|---|
| 1,134,294 | Supanz | Apr. 6, 1915 |
| 1,224,213 | Rosenthal | May 1, 1917 |
| 1,502,673 | Hole | July 29, 1924 |
| 1,639,590 | Corkran | Aug. 16, 1927 |
| 1,656,031 | Aalborg | Jan. 10, 1928 |
| 1,687,428 | Corkran | Oct. 9, 1928 |
| 1,707,846 | Corkran | Apr. 2, 1929 |
| 1,971,090 | Zwicky et al. | Aug. 21, 1934 |
| 2,409,497 | Kessel | Oct. 15, 1946 |
| 2,665,009 | Harstick | Jan. 5, 1954 |

FOREIGN PATENTS

| | | |
|---|---|---|
| 37,107 | Germany | Oct. 1, 1886 |
| 9,087 | Switzerland | Oct. 2, 1894 |
| 538 | Great Britain | of 1881 |